(No Model.)

E. JUNGENFELD & H. RASSBACH.
GAS COMPRESSOR.

No. 332,346. Patented Dec. 15, 1885.

Attest:
Geo. L. Wheelock
V. A. Lewis

Inventor
Edmund Jungenfeld
Hermann Rassbach
By Knight Bros attys

UNITED STATES PATENT OFFICE.

EDMUND JUNGENFELD AND HERMANN RASSBACH, OF ST. LOUIS, MISSOURI, ASSIGNORS TO THE EMPIRE REFRIGERATING COMPANY, OF SAME PLACE.

GAS-COMPRESSOR.

SPECIFICATION forming part of Letters Patent No. 332,346, dated December 15, 1885.

Application filed November 17, 1884. Serial No. 148,190. (No model.)

*To all whom it may concern:*

Be it known that we, EDMUND JUNGENFELD and HERMANN RASSBACH, of the city of St. Louis, State of Missouri, have invented a certain new and useful Improvement in Gas-Compressors, of which the following is a full, clear, and exact description, reference being had to the accompanying drawings, forming part of this specification, and in which—

Figure 1:
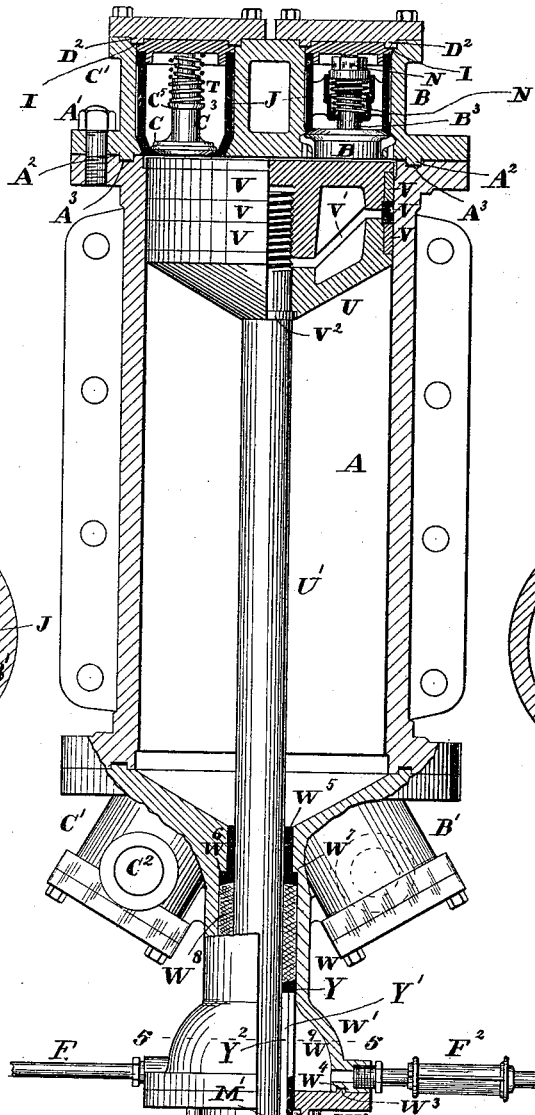
Figure 5:
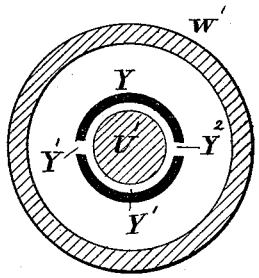
Figure 2:
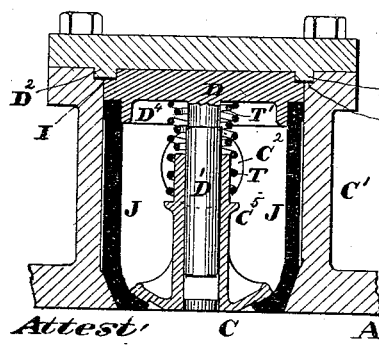
Figure 3:
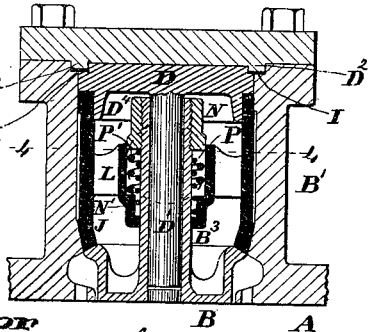

Figure 1 is a longitudinal section of our improved compressor. Fig. 2 is an enlarged section of one of the discharge-valves. Fig. 3 is a similar view of one of the suction-valves. Fig. 4 is a transverse section taken on line 4 4, Fig. 3, and Fig. 5 is a similar view taken on line 5 5, Fig. 1.

Our invention relates to certain improvements in ammonia-gas compressors; and it consists in features of novelty hereinafter fully described, and pointed out in the claims.

Referring to the drawings, A represents the cylinder, provided at each end with a suction and a discharge valve.

B represents the suction, and C the discharge valve, and B' C' their respective housings, through which are supply and discharge openings $B^2$ $C^2$, with which suitable pipes connect. The valves have stems $B^3$ and $C^3$, that are made hollow to receive pins D', formed upon disks D, fitting inside the ends or caps of the valve-housings, which have projections $D^2$, fitting in recesses in the disks and walls of the housings. Gaskets I, of rubber or other suitable material, are placed in these recesses, and thus the joints between the disks and housings are made gas-tight. Within the housings are casings J, against which the valves seat, as shown at $B^4$ and $C^4$, Figs. 3 and 2. A spider, L, is formed upon or secured to the interior of the casing of the suction-valve. The valve-stem passes through the hub, and on its end is a screw-cap, N, between which and an inturned flange, L', of the hub is a spring, N', that tends to hold the valve in its closed position. The hub has an enlargement, P, in which is placed a spiral spring, P'. As the valve approaches the limit of its movement in opening, the cap N, entering this enlargement of the hub, comes against the spring P' and cushions the valve, to prevent its "hammering." The springs N' and P' are preferably made right and left—that is, coiled oppositely—to prevent their locking or engaging with each other.

On the outside of the stem of the discharge-valve is a flange, $C^5$, between which and the disk D is a spiral spring, T, to hold the valve in its closed position, and between the outer end of the stem and the disk is a spring, T', acting in the same manner and for the same purpose as the spring P' of the suction-valve. The disks D preferably have flanges $D^4$, that fit inside the casings J. All of the parts within the housings may be removed and replaced by taking off the ends or heads of the housings, which are attached by bolts, as shown. The housings are preferably made in one part with the heads of the cylinder, which are connected to the cylinder by bolts A', and which have projections $A^2$, fitting in grooves in the ends of the cylinder, that are provided with gaskets $A^3$.

U represents the piston, and U' the piston-rod. The piston is made in two parts, as shown in Fig. 1, the outer part screwing upon the rod. The periphery of the piston is grooved out to receive continuous packing-rings V, said rings being formed of any well-known soft packing material, whereby by screwing up the outer part of the piston the rings may be kept out tight against the cylinder.

V' represents the space between the two parts of the piston. The inner part of the piston is kept from inward movement on the rod by a collar or flange, $V^2$, on the rod. The inner end of the piston is made conical, as shown in Fig. 1, and the head of the stuffing-box end of the cylinder is correspondingly shaped, and by this arrangement the clearance of the piston is reduced to a minimum. Owing to the shape of this head of the cylinder the valve-housings at this end are set at an angle to the axis of the cylinder. Both ends of the piston and both of the cylinder-heads may be made conical, if desired, instead of one only, as shown.

To prevent any leakage through the stuffing-box, we adopt the following construction: W represents a neck formed upon or secured to the front cylinder-head, which terminates in a bell-mouth, W', to which is secured a head or cover, $W^2$, having a projection, $W^3$, fitting in a groove in the bell-mouth, provided with a gasket, $W^4$. Surrounding the piston-rod in the cylinder-head is a ring, $W^5$, having a flange, $W^6$, fitting against a shoulder, $W^7$. Between the neck W and the piston-rod, outside of the ring $W^5$, is a packing, $W^8$, and at the end of this comes a sleeve, Y, which extends out through the head $W^2$, and between which and the piston-rod is a space or chamber, $Y'$, which communicates with the chamber $W^9$ of the bell-mouth by means of slots or openings $Y^2$ in the sleeve. The gas is prevented from escaping between the head $W^2$ and the sleeve Y by a packing, $Y^3$, held between the sleeve and a flange, $W^{10}$, of the head, and being tightened by a collar or ring, M, having a flange, $M'$, fitting against the packing. The collar is pressed upon the packing by nuts $H'$ on rods H, that pass through the collar and are fast upon the head $W^2$, and they also pass through a flange, $Y^6$, on the sleeve and a collar or ring, G, beyond the end of the sleeve. The sleeve is tightened on the packing $W^8$ by nuts $H^2$ on the rods H. The collar or ring G has a flange, $G'$, fitting between the outer end of the sleeve and the piston, and between this flange and a rib, $Y^7$, on the inside of the sleeve, is a packing, $Y^8$, which may be tightened by nuts $H^3$ on the rods H, to prevent any leakage of gas between the sleeve and piston-rod.

During the operation of the machine cold oil is circulated through the chambers $Y'$ and $W^9$, to cool the piston-rod. It enters through a pipe, F, and escapes or is carried off through a pipe, $F'$, the latter of which is provided with a glass tube, $F^2$. Any gas that happens to escape through the packing $W^8$ collects in chamber $W^9$, and is carried along with the returning oil to the oil-cooler, which is connected to the suction side of the pump to return the gas to the system, while the oil is cooled for a second use. This leakage of the gas is not intended, and can be prevented by tightening on the packing $W^8$. The object of the glass tube or gage $F^2$ is to indicate this leakage of gas, at which point it can be seen bubbling up through the oil.

We are aware of United States Letters Patent No. 185,578, which were granted on the 19th December, 1876, to T. L. Rankin. We are also aware that hollow stems for valves are not new, and that the mere substitution of a hollow stem for the solid stem shown in the Rankin patent would not involve patentability. The said Rankin valve with this substitution would not, however, be the equivalent of our invention; and we hereby disclaim any parts of our said invention which are common to the said Rankin valve.

We claim as our invention—

1. In a gas-compressor, the combination, with the housing $B'$ and the suction-valve B, having the hollow stem $B^3$ projecting therefrom, of the casing J, upon the lower end of which the valve seats, said casing having the spider L and hub through which said valve-stem passes, the disk D, bearing upon the upper end of the casing J, and having the pin $D'$, fitting within the hollow stem of the valve, the screw-cap N on the valve-stem, and the spring surrounding said stem and exerting its pressure in opposite directions against the hollow hub and screw-cap, substantially as set forth.

2. In a gas-compressor, the combination of the neck having a bell-mouth forming a chamber, $W^9$, slotted sleeve forming a chamber, $Y'$, packing $W^8$, means for tightening the sleeve on the packing, and pipes F $F'$, all arranged and operating substantially as shown and described, for the purpose set forth.

3. In a gas-compressor, the combination of the neck W, head $W^2$, sleeve Y, packing $W^8$, collars M and G, packings $Y^3$ and $Y^8$, rods H, and nuts $H'$ $H^2$ $H^3$, all arranged and operating substantially as shown and described, for the purpose specified.

4. The combination of the valve-case, the spider L, secured therein and having the hollow hub, the enlargement P, and inturned flange $L'$, the valve B, having the stem $B^3$ projecting through said hub, the screw-cap N on said valve-stem, and the spring $N'$ and $P'$, surrounding the stem and coiled in opposite directions, substantially as set forth.

EDMUND JUNGENFELD.
HERMANN RASSBACH.

In presence of—
GEO. H. KNIGHT.
BENJN. A. KNIGHT.